LINEAR PREDICTOR CIRCUITS

Filed April 13, 1951 6 Sheets-Sheet 1

INVENTOR
B. M. OLIVER
BY Hugh S. Wertz
ATTORNEY

LINEAR PREDICTOR CIRCUITS

Filed April 13, 1951 6 Sheets-Sheet 2

INVENTOR
B. M. OLIVER
BY Hugh S. Wertz
ATTORNEY

INVENTOR
B. M. OLIVER
BY Hugh S. Wertz
ATTORNEY

INVENTOR
B. M. OLIVER
BY Hugh S. Wertz
ATTORNEY

LINEAR PREDICTOR CIRCUITS

Filed April 13, 1951 6 Sheets-Sheet 5

INVENTOR
B. M. OLIVER
BY Hugh S. Wertz
ATTORNEY

LINEAR PREDICTOR CIRCUITS

Filed April 13, 1951 6 Sheets-Sheet 6

INVENTOR
B. M. OLIVER
BY Hugh S. Wertz
ATTORNEY

United States Patent Office 2,732,424

Patented Jan. 24, 1956

2,732,424

LINEAR PREDICTOR CIRCUITS

Bernard M. Oliver, Morristown, N. J., assignor to Bell Telephone Laboratories, Incorporated, a corporation of New York Application April 13, 1951, Serial No. 220,741

6 Claims. (Cl. 178—5)

This invention relates to transmission systems and, more particularly, to pulse transmission systems.

This application is a continuation in part of my applications, Serial Nos. 170,977, now Patent 2,681,385, issued June 15, 1954, and 170,978, now Patent 2,701,274, issued February 1, 1955, filed June 29, 1950.

It has for some time been known that certain principles of statistical mechanics can be applied to communication theory. By the application of these principles, it can readily be shown that the normal present-day communication system employs a channel capacity greater than that required to send that amount of information which is actually necessary to describe the message. Most communication signals are not random, but exhibit a considerable degree of correlation—semantic, spatial (in television, for example), temporal, etc. Thus, a normal present-day communication system, employing a channel capacity that will suffice for the transmission of a completely random signal, is inefficient to the extent that the transmitted signals are correlated.

It is the primary object of the present invention to increase the efficiency of transmission systems now commonly in use for the communication of intelligence by reducing the redundancy in the signals which are transmitted.

It is another broad object of the present invention to reduce the channel capacity required of communication systems.

Similarly, it is a further object of the invention to lessen the average signal power required in a communication system without degradation of the message transmitted thereby.

It is still another object of the invention to reduce the frequency band width which is required to transmit a specified message.

In accordance with the invention and in furtherance of its various objects, the signal redundancy in wide band transmission is materially reduced by periodically sampling the message wave to be transmitted, predicting the succeeding value of the signal, comparing this predicted value with the actual value, and then transmitting only the difference, i. e., the error in prediction. At the receiver, the received error signal and a computed (i. e., predicted) signal equivalent to the predicted value at the transmitter are combined to yield a replica of the original signal. This technique relies for its effectiveness on the aforementioned correlation or interdependence which is found to exist in several forms in substantially all communication signals.

In one exemplary arrangement of the invention, a weighted sum of several immediately preceding signal values affords a prediction utilizing a portion of the signal correlation. In television, for example, these preceding signal values can, in accordance with the invention, be drawn not only from preceding elemental areas on the same line, but from prior lines and, in certain arrangements, from prior frames or fields as well.

In particular in television systems which are characterized by an interlaced scanning pattern, it is necessary in order to utilize signal values drawn from elemental areas of the preceding field to delay signal values by a time interval which is substantially one field time period less one-half a line time period. In accordance with one aspect of the invention, there is provided an arrangement to secure this delay by means of storage tubes. In this arrangement, an input signal is stored for the desired interval in the form of an electrostatic charge distribution which is subsequently read for the recovery of a delayed facsimile of the input signal.

In all the embodiments to be described, it is in accordance with the invention, although not necessary thereto, to quantize the signal sample amplitudes and to transmit pulses representative of these amplitudes, i. e., to employ those techniques which are familiar in the art of "pulse code modulation."

The invention will be more fully understood in the light of the following detailed description, taken in connection with the appended drawings, in which.

Figure 1:
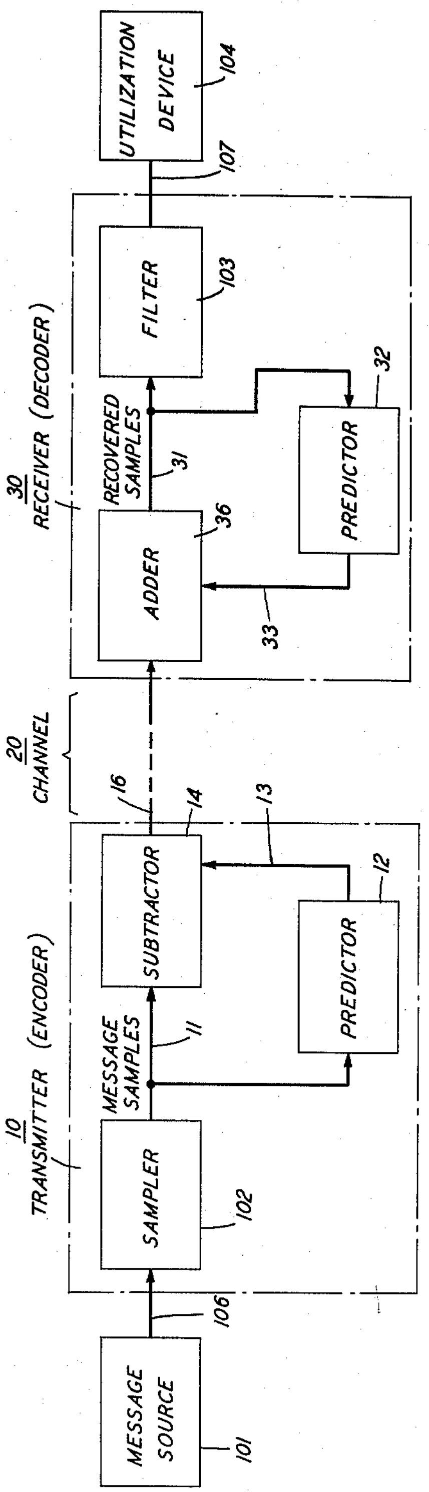
Fig. 1 is an over-all block diagram of a simple illustrative embodiment of the basic transmission system of the invention.

Before referring specifically to these figures, however, it will be of value to examine certain fundamental principles. It is to be noted that most of the signals which are encountered in communications (e. g. speech, music, television) may be limited to a definite frequency band without being seriously distorted. Furthermore, it is readily demonstrable that if this frequency band extends from zero to a frequency $W_0$ cycles per second, then the signal, thus band limited, can assume only $2W_0$ independent values per second. Accordingly, it can also be shown that the amplitude values obtained by sampling the signal at times uniformly spaced $$\frac{1}{2W_0}$$

seconds apart serve to specify the signal completely. It will be convenient to designate this time separation as a Nyquist interval.

It is also well known that, even if the original signal has a continuous amplitude range, it is not necessary to send the exact amplitude of each sample. The amplitude range may instead be divided into a number of steps, with each sample being sent as a pulse whose amplitude corresponds to the amplitude of the step nearest the exact sample amplitude. The effect of this technique of "quantizing the samples" is merely to add a more or less random noise to the signal. If the number of steps is made sufficiently large, this noise is negligible.

It follows from the foregoing that in order to send a signal of duration T, it is necessary to send approximately $2W_0T$ samples, each of which can have $b$ possible values, $b$ being a function of the closeness of the quantization employed. Values zero to $b$ can, for example, be represented in terms of a binary code, which is the underlying basis of most pulse code modulation (known generally as PCM) systems. Obviously, if $b \leqq 2^n$, then each sample can be sent as a code group of $n$ bivalued pulses (most simply, on-off pulses).

PCM uses an $n$-fold increase in band width (to send $2nW_0$ pulses per second rather than $2W_0$) and in return therefor achieves the ability to transmit substantially without error in the presence of poor signal-to-noise ratios. This indicates the well-known fact that the required band width and signal-to-noise ratio (in decibels) are reciprocally related to each other. Thus, as an example of the converse situation, if it were desired to recover a signal with only a twenty decibels signal-to-noise ratio and the circuit were capable of a forty decibels signal-to--noise ratio, it would be a straightforward matter to reduce the channel band width to $$\frac{W_0}{2}$$

It can be shown, as a more general approach to the problem, that the capacity C of a channel (in binary digits per second) is given by $$C=W \log_2 \left(1+\frac{P}{N}\right)$$

where W equals the channel band width, P equals the average signal power, and N equals the average noise power. This is an exchange equation. Thus, provided that C is kept constant, it is possible to vary W, P, and N and still transmit the same information at the same rate. It is readily demonstrable that, for two channels of equal capacity, it is approximately true $$\left(\text{when } \frac{P_1}{N_1} \gg 1 \text{ and } \frac{P_2}{N_2} \gg 1\right)$$

that $$\text{Log } \frac{P_2}{N_2}=\frac{W_1}{W_2} \log \frac{P_1}{N_1}$$

where the subscripts indicate the respective channels. It is apparent from this equation that if no use is made of message correlation, a reduction of the band width by a factor $$\frac{1}{m}$$

requires roughly $m$ times the signal-to-noise ratio in decibels. Obviously, when the desired signal-to-noise ratio in the recovered signal is already high, this exchange relationship imposes an almost prohibitive signal-to-noise requirement on the channel for any appreciable saving in band width. In any given system, with a certain required channel capacity C, the optimum values of the variables W, P, and N are not necessarily in the direction of minimum W. A typical pulse code modulation system is an example in point. The ideal approach to the problem is to reduce the required channel capacity C, and this can be done by sending only as much information as is actually necessary to describe the message. Thus, in accordance with the invention, as much redundancy as possible is removed from the message before it is transmitted, and then W, P, and N are apportioned in whatever way is most suitable for the particular channel to be used.

It has already been mentioned that the maximum number of independent values that a communication signal can assume per second is $2W_0$, where $W_0$ is the signal band width. But it is extremely unlikely that all of the samples of any communication signal actually will be independent, since the typical communication source is not such that the successive sample values are chosen at random out of a set of possible values. For purposes of illustration, however, it will be of interest to consider first a signal source which produces $2W_0$ samples per second, each sample having $b$ possible values and each sample being chosen independently, with all of the $b$ possible values equally likely of occurrence. With such a source there is no way of determining what the next sample will be, even if all the history of the signal is known. To specify one out of $b$ possible values $\log_2 b$ binary digits (bits) and hence $\log_2 b$ "on-off" pulses. Thus, to send this signal, a channel capacity of $2W \log_2 b$ bits/second is required. Most existing communication systems provide roughly this much capacity even though it is not needed for all typical signals. That is, although the signals put over communication systems are not random, present systems provide enough channel capacity to send a random noise (band limited to $W_0$) having a certain amplitude range. As has already been emphasized, the fact is that each successive sample of an ordinary signal is not independent of the previous samples, i. e., is not a choice of one of $b$ equally likely amplitudes. On the contrary, the previous history of the signal makes all but a few of the $b$ possible amplitudes for the next sample extremely unlikely.

It is thus feasible as well as economical to compute at each time what the next sample is most likely to be and then to send only the discrepancy between the prediction and the actual value of the sample. In the limit, therefore, only if the next sample contains something which is unpredictable (i. e., some new and independent information) will a signal be sent. Instead of sending the entire amplitude of a sample, it is in accordance with the invention to send only the mistakes in prediction: the amount, so to speak, by which each next sample surprises the system. It is obvious that if most of the sample values are susceptible of close prediction (which will be true if there is a large amount of correlation or redundancy in the signal) then the average $(\text{amplitude})^2$ of the mistakes will be correspondingly much less than the average $(\text{amplitude})^2$ of the original signal. That is, the power in the error signal will be much less than in the original signal. It can indeed be shown that if the computer (or predictor) makes full use of the past, then the power in the error signal will be the entropy power of the original signal, i. e., the power of a white Gaussian noise having the same entropy. The term "entropy" is here used in the sense employed by Shannon in his "Mathematical Theory of Communication," in volume 27 of the Bell System Technical Journal, pages 379–423 and 623–656, in which the thermodynamical (i. e., Gibbs' statistical-mechanical) concept of entropy as the unavailability or degree of randomness of energy is applied to communication theory by associating "information" with the amount of freedom of choice in the construction of a message and the corresponding a priori ignorance at the receiver as to the content of the message.

Thus, it is in accordance with the invention to send the message over a channel with the same band width as before, but with less average power, so that the required channel capacity is therefore reduced. Shannon, in his article mentioned above, has shown that the channel capacity C must be at least equal to the entropy rate, H', of the message source, where this entropy rate of the message source is the sampling frequency times the average uncertainty of the next sample, assuming that all the past is known. In accordance with the invention, then, it is conceivable that the required channel capacity can be reduced as close to the lower theoretical limit as is desired.

The above-mentioned power saving is of direct importance in frequency division multiplex circuits, where the low probability of the simultaneous occurrence of high instantaneous powers in several channels (due to bad guesses by the predictors) indicates that the entire effective power level can be raised to give better transmission. On the other hand, in television, for example, the reduction in power can advantageously be traded for a band width reduction. Thus, it is in accordance with the invention to "remap" the error signal so as to provide a reduced band width, as will be discussed at a later point in the specification.

In Fig. 1, there is shown, in block schematic form, a simple illustrative arrangement of a communication system embodying the principles outlined above. The message 106 from a message source 101 is applied to the transmitter 10, where it is operated on to yield a signal 16 from which much of the redundancy has been removed. If this message 106 is a continuous wave, the first stage of the transmitter is preferably a sampler 102, which produces a series of message wave samples 11 as pulses of different amplitude. In this transmitter, the samples are applied to a computer or predictor 12, and at the output of this predictor, there appears a series of predictions 13, each the predicted value of a sample based on the values of a number of the previous samples.

Often, the previous samples used to determine a particular predicted value will comprise primarily immediately preceding samples, but in certain cases, such as in a television signal where the original elements which are in close proximity in the picture and therefore highly correlated may, because of the scanning process, be reproduced as considerably separated parts of the signal, there may more advantageously be utilized samples a considerable number of sampling intervals previous in time without utilization of all the intervening samples. Each of the predicted sample values 13 appears at the same instant that the true corresponding sample 11 is received. The two are compared in a subtractor 14, and the error 16, if any, is sent over the channel 20. At the receiver 30, an identical predictor 32 makes the same predictions 33 as does the transmitter predictor 12, based on the recovered message samples 31, which can for the present be assumed to be the same as the original message samples 11. Since this predictor 32 will make the same mistakes as the predictor 12 at the transmitter, when the output 33 of this predictor is added to the received error 16 in the adder circuit 36 the resultant sample is indeed the counterpart of the original sample.

If a continuous wave message is the desired output, these recovered samples 31 are fed to a filter circuit 103 to yield a continuous wave 107 from the sample pulses. This continuous wave 107, which is equivalent to the original message 106, is then applied to utilization device 104.

To illustrate how the system gets started, let it be assumed that there has been no message for a long time. In that case, everything is quiescent; both predictors 12 and 32 are predicting zero for the next sample. When the first sample different from zero arrives, nothing is subtracted from it at the transmitter, and nothing is added at the receiver. Consequently, the sample appears at the output, both predictors go to work on this sample, and the system is functioning.

If the predictor really does remove all redundancy from the signal, however, certain other considerations are important. Since everything which is sent is then essential, if a hit occurs in the channel and one error-sample is disturbed, the computer 32 at the receiver is at a loss from then on. Although an output will continue to appear at the receiver, it might have little relation to what was sent. Such operation is manifestly intolerable. But if the redundancy is not entirely removed at the transmitter, it is, in general, true that the system can be so designed that the solution again converges to the proper one at the receiver. The frequency and magnitude of the disturbances in the channel thus set a limit to the amount of redundancy which can, in accordance with the invention, be removed. This is not, however, a serious limitation, since the use of pulse code modulation or some other such rugged system would permit 99 per cent or more of the redundancy to be safely removed.

Figure 2:
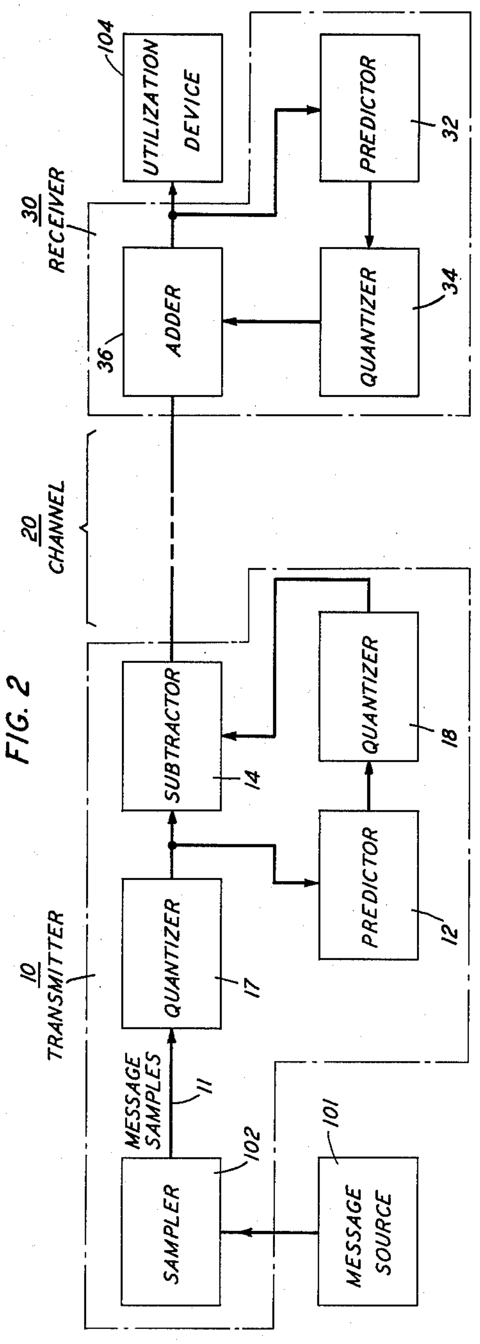
Fig. 2 is an over-all block diagram of an exemplary arrangement of the invention in which quantization is employed.

The use of a quantized transmission system (such as PCM) for the channel, in order to obtain rugged transmission, requires a modification of the system along the lines of the exemplary embodiment shown in Fig. 2. If the two predictors are identical, then it is essential that they be supplied with identical inputs. If what is done is merely to quantize the output of the transmitter, this will not be the case. One solution, in accordance with the invention, is to employ quantizer 17 to quantize the input to the predictor 12 and also, to the same scale, to utilize quantizers 18 and 34, respectively, to quantize the outputs of predictors 12 and 32, respectively. Since, at the transmitter, both inputs to the subtractor 14 are now quantized to the same step heights, the ouput will also be quantized to these same levels, and further quantization in the channel (i. e., regeneration), is all to the good. Furthermore, both predictors are working on the same quantized series of samples.

Figure 3:
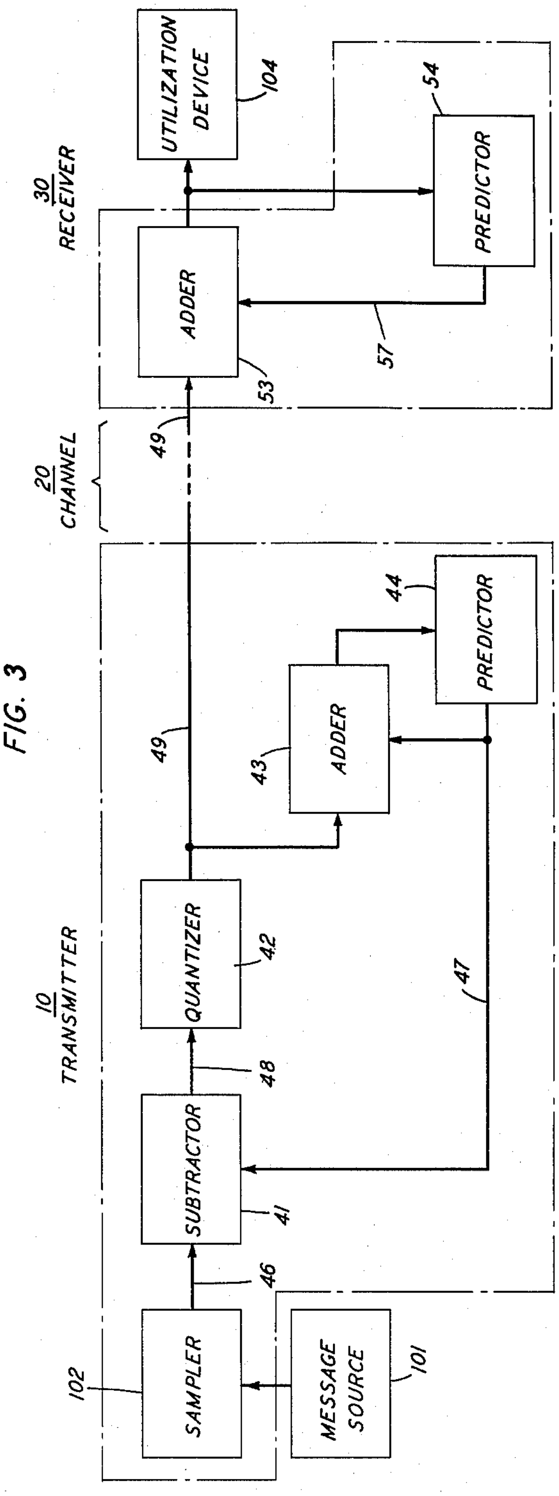
Fig. 3 is an over-all block diagram of another illustrative embodiment of the system which also employs quantization.

Another exemplary arrangement is illustrated in Fig. 3. In this illustrative embodiment, the receiver 30 is duplicated as part of the transmitter 10 and is fed from the same quantized signal 49 at both locations. At the transmitter, the message samples 46 are compared in subtractor 41 with the predicted values 47 furnished by predictor 44, which, along with adder 43, is a duplicate of the adder 53 and predictor 54 which constitute the receiver. The error signals 48 which result from this comparison are then quantized in quantizer 42, the quantized signals 49 being transmitted over the channel 20 to the receiver 30 where they are added in adder 53 to the signals 57 furnished by predictor 54. This arrangement uses two fewer quantizers and one more adder than the exemplary embodiment illustrated in Fig. 2, which difference in complexity is somewhat in its favor. The arrangement of Fig. 3 is preferable also in that it does not, as does that of Fig. 2, quantize both the true signal and the predicted signal before subtraction but quantizes only the result. It is apparent that quantizing both beforehand permits quantizing errors in the result anywhere from +S to −S, where S is the step height (i. e., the magnitude of a quantum), while in the embodiment wherein the continuous signals are first subtracted, the quantizing error is confined to the region between $$+\frac{S}{2} \text{ and } -\frac{S}{2}$$

All the elements shown in Figs. 1, 2 and 3, are, with the exception of the predictors, well known in the art. For example, adders and subtractors can, in accordance with the invention, be simple resistance networks supplied with the proper polarity of signals. Similarly, it is in accordance with the invention to use quantizers of any of several types which are in common use. A PCM "flash coder" type of tube with the various digit inputs sliced and recombined with the proper attenuations is one example. Another technique which is in accordance with the invention is to use a ribbon beam gun structure, as in the flash coder tube, but with the code plate replaced by a staircase-shaped target. Similarly, any of the various feedback schemes which are common in PCM systems can be used, provided that the signal band width is not too great. In particular, there may be utilized the pulse code transmission system in which a coder and decoders employed are of the type described in the Bell System Technical Journal, January 1948, the articles being entitled "An experimental multichannel pulse code modulation system of toll quality" by L. A. Meacham and E. Peterson, pages 1 to 43, and "Electron beam deflection tube for pulse code modulation," by R. W. Sears, pages 44 to 57. Computers or predictors which are capable of serving the functions demanded by the invention are, however, not at all known in the art. For this reason, several suitable predictor arrangements will be disclosed in this specification.

A predictor can, in accordance with the invention, be either linear or non-linear, variant or invariant. It is linear if its prediction is a linear function (e. g., an algebraic sum) of the signal data which it receives. It is invariant if its method of prediction does not change with time or with the signal.

Figure 4:
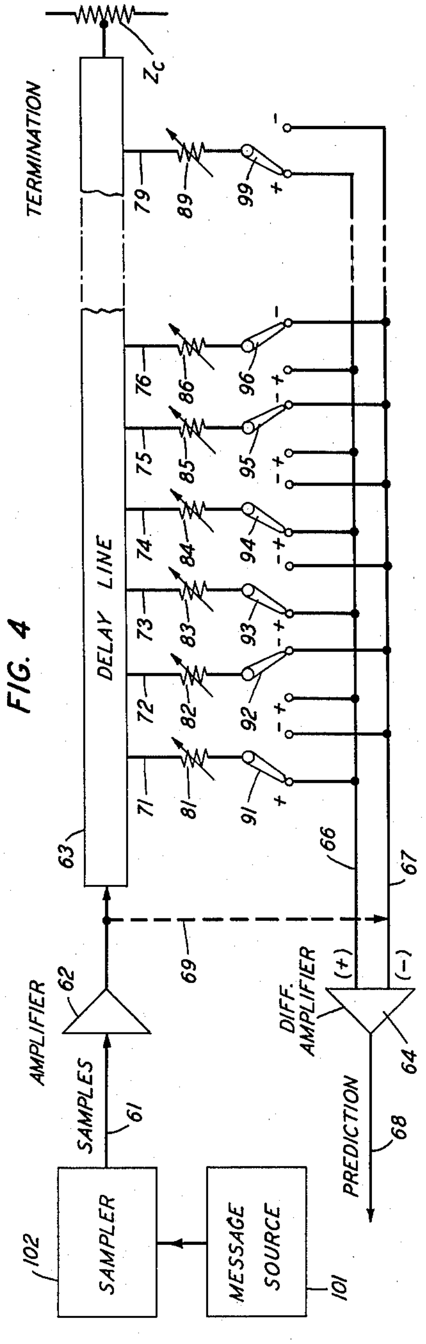
Fig. 4 is a schematic representation of an exemplary arrangement of a linear invariant predictor which can be used in the practice of the invention.

For the purposes of illustration, there is shown in Fig. 4 an exemplary arrangement of a linear invariant predictor suitable for use as the predictor 12 in the arrangements of Figs. 1, 2, and 3. This linear invariant predictor gives a prediction which is the algebraic sum of certain past samples, each multiplied by an appropriate weighting coefficient. The signal samples which are provided from the sampler 102 are supplied to a delaying means, which in this illustrative embodiment comprises a substantially lossless delay line 63, terminated in its characteristic impedance $Z_c$. It may be advantageous, in some instances, to amplify the signal samples which are being supplied to the delay line. To this end, the amplifier 62 is interposed. The taps 71, 72, 73 . . . 79 on this delay line are separated by amounts equal to the interval between successive samples, which, in the usual case, is a Nyquist interval. Thus, if the sample to be predicted is just being applied to the line, the signal at tap 71 is the immediately preceding sample, the signal at tap 72 is the one immediatetly preceding the one at tap 71, etc. Thus, at the time a message sample is being applied to the delay line, there is available at the taps along the line a history of the preceding samples. It is within the spirit of the present invention to utilize the correlation between the present and preceding samples to predict the value of the present or instant sample. For a particular message wave, the correlation is often such that a good prediction $S_p$ for the present sample in terms of the preceding samples $S_i$ is given by $$S_p = a_1S_1 + a_2S_2 + a_3S_3 \ . \ . \ . \ + a_iS_n = \sum_1^n a_iS_n \quad (1)$$

where the subscripts identify a particular sample with reference to the number of sampling intervals by which it preceded the present sample, and the magnitude of the coefficients ($a_1$, $a_2$, . . . $a_n$) are determined from the statistics of the signal. There is naturally a question as to how many previous samples should be taken into account, i. e., how many taps are necessary and how much delay is required in the delaying means. The answer necessarily depends on signal statistics. In certain signals, the nature of the correlation is such that an accurate prediction can be made using only a few past samples. That is, the more ancient samples are only slightly correlated with the present sample and offer only negligible contribution to the prediction. Speaking in terms of the coefficients, $a_1$, $a_2$, . . . $a_n$, this means that $n$ must be chosen so that $a_i$ for $i>n$ is negligibly small.

Figure 9:
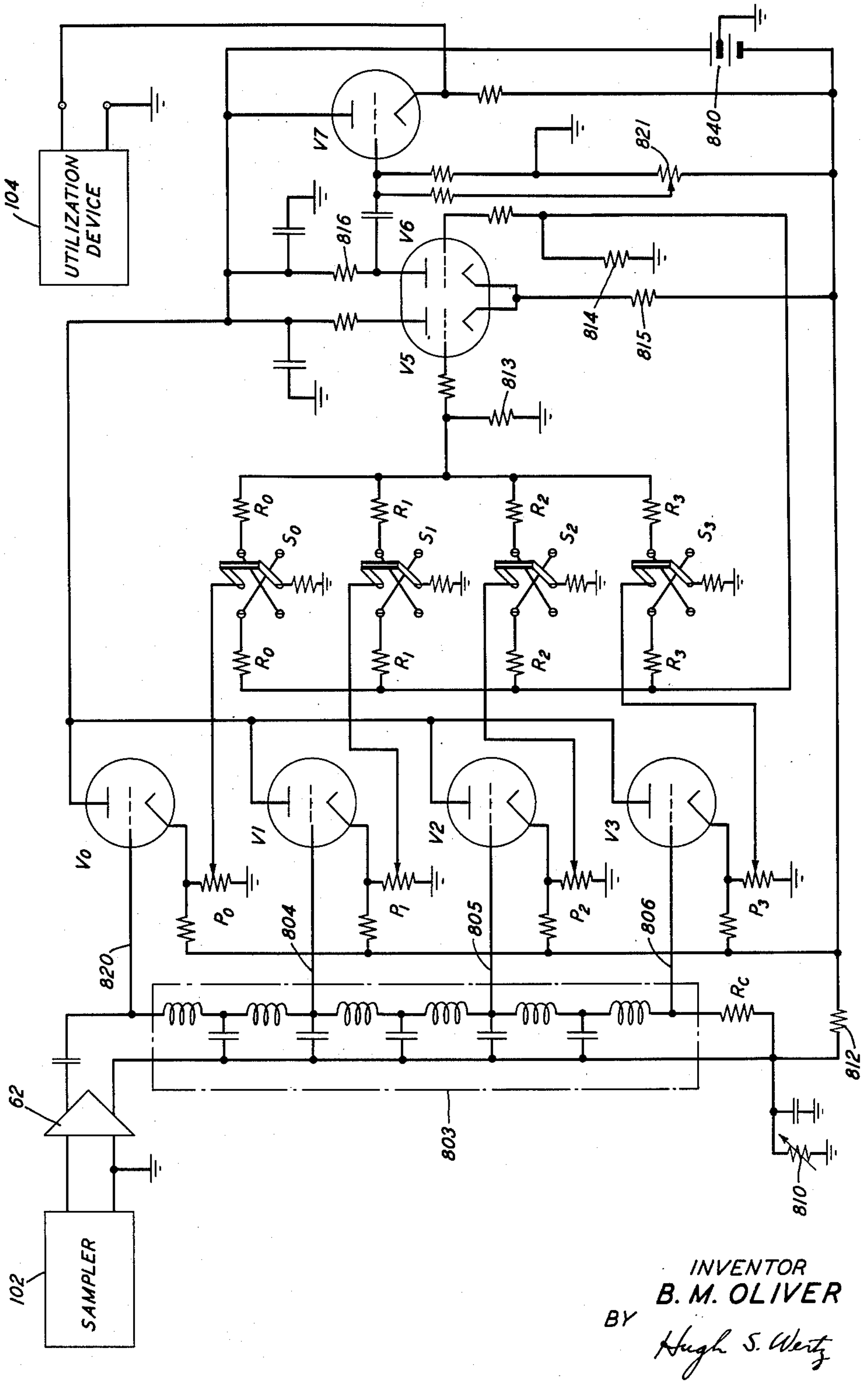
Fig. 9 shows partly in block diagram form and partly schematically an exemplary form of linear invariant predictor of the kind shown in Fig. 4.

With reference again to the predictor of Fig. 4, variable attenuators 81, 82, . . . 89 determine, by their settings $a_1$, $a_2$ . . . $a_n$ the fractions of the voltages appearing at the taps 71, 72, . . . 79 which are applied to one or the other of the two inputs of a differential amplifier 64, in accordance with the requirements of the signal statistics of the message wave. This amplifier, a typical example of which will be described with reference to the schematic circuit shown in Fig. 9, is adapted to give a positive output if a positive voltage is applied to its input 66, marked (+), and a negative output if a positive voltage is applied to its input 67, marked (−). The output is thus always proportional to the voltage difference on the two input leads 66 and 67, and for this reason, the device is described as a differential amplifier. Whether a voltage appears at the positive or the negative input of the differential amplifier is determined by the position of the switches 91, 92 . . . 99, respectively, through which the attenuated tapped voltages are fed to the amplifier. The settings of these switches are, of course, determined by the algebraic sign of the corresponding $a_i$ coefficient in Equation 1. It will be seen that the output of the differential amplifier, i. e., the predicted value of the signal sample, can be represented algebraically as:

$$S_p = a_1S_1 + a_2S_2 + \ . \ . \ . \ a_nS_n = \sum_1^n a_iS_i \qquad (2)$$

which corresponds with Equation 1.

It is apparent that by adding the full value of the present sample to the proper input of the differential amplifier 64, the output 68 may be made to consist of the errors in prediction rather than the prediction alone. The dotted connection 69 in Fig. 4 illustrates this arrangement. By this means, the function of the subtractor 14 as shown in Fig. 1 is effectively included in the predictor 12 of that figure.

Just what particular variation of the predictor arrangement illustrated in Fig. 4 is most suited to a particular system is obviously a function of the signal statistics. Since the transmission of television image signals is of considerable importance, an examination of the nature of such signals will offer a valuable illustration. In television, the scanning process converts a function (brightness) of three variables $b=f(x, y, t)$, where $x$ and $y$ are space coordinates and $t$ is time, into a function of one variable, time alone. As a result of this remapping, elements which are neighboring but not on the same scanning line are separated in the signal by approximate multiples of a line scanning period or of a field. Similarly, the signals representative of the same element are separated by frame times. There is, therefore, a high correlation in the signal between samples which are separated by multiples of a line, field or frame time. To make full use of the linear correlation in a television picture, therefore, the delay line of Fig. 4 should have a total delay of several line times or, better still, of several field times. With such an arrangement, taps on the line would, however, be required only at delays corresponding to samples representing elements in the space-time vicinity of the element (and sample) under consideration. But rather than to use a single long delay line, it is more practical to employ large blocks of delay for the line, field, and frame periods, together with elemental delay lines for access.

Figures 5, 6, 7A:
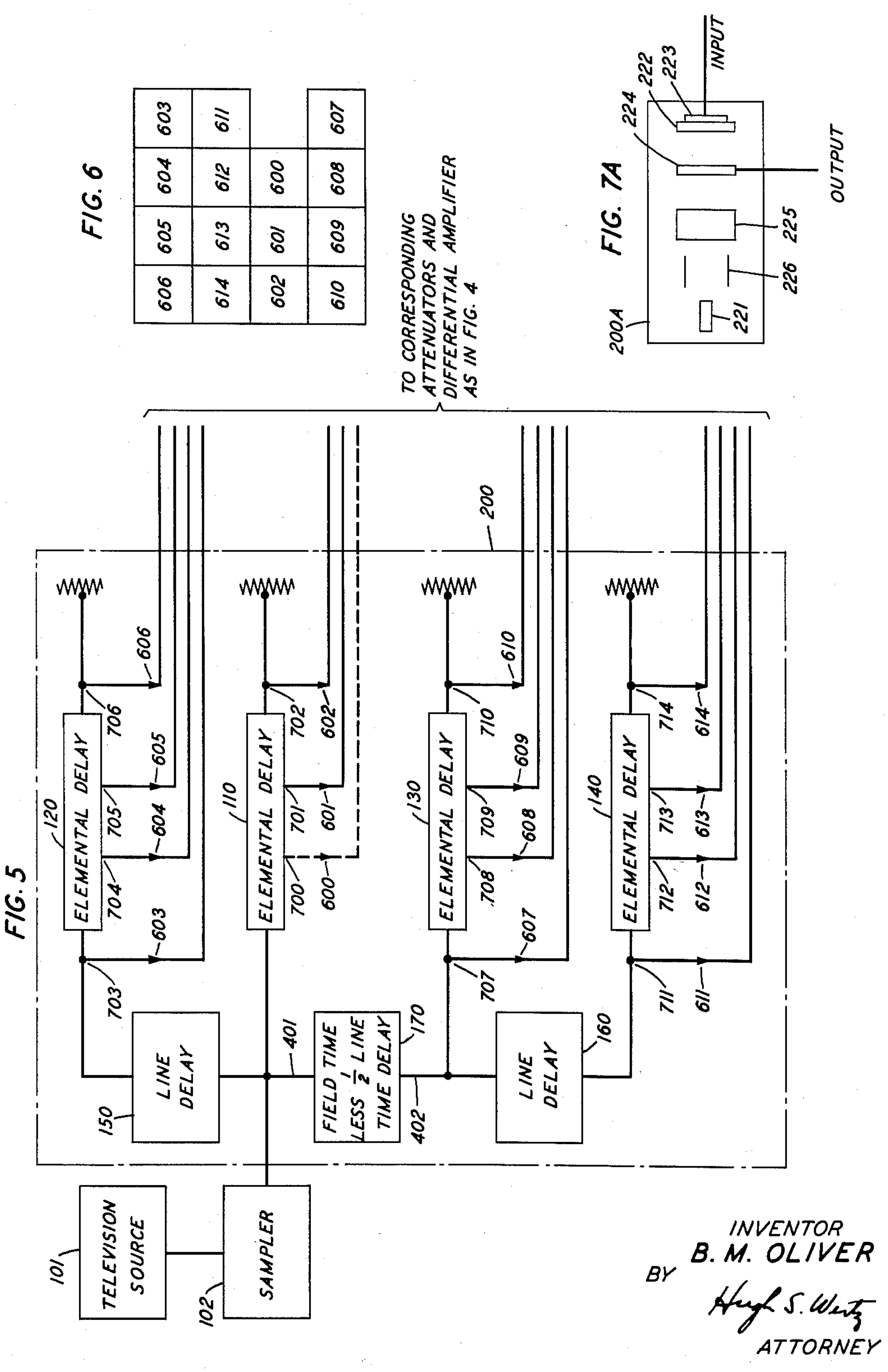
Fig. 5 is a schematic representation of an exemplary linear invariant predictor which is particularly adapted for television and which utilizes for prediction samples in the same scanning line, samples in a preceding scanning line of the same field, and samples in a preceding field.
Fig. 6 shows pictorially the spatial relationship of samples of the kind utilized in the predictor shown in Fig. 5.
Fig. 7A shows schematically a storage tube suitable for use in this arrangement.

A specific example of such an arrangement suitable for the practice of the invention is shown, for purposes of illustration, in Fig. 5. In this arrangement, signal samples representing immediately preceding elements in the same scanning line, elements in the immediately preceding scanning line in the same field, and elements in the immediately preceding field, are combined in the prediction of a particular sample.

In Fig. 6, there is shown pictorially, the spatial relationship of the array of picture elements which are represented by the samples utilized in the predictor shown in Fig. 5. In this array, the element represented by the sample to be predicted is shown as 600. The elements 601 and 602 are the immediately preceding elements on the same line, the elements 603, 604, 605 and 606 are elements on the immediately preceding line of the same scanning field, and the elements 607, 608, 609, 610, 611, 612, 613 and 614 are elements of the two adjacent lines of the preceding scanning field. Since as a consequence of interlacing, the starting points of the odd and even field have a horizontal displacement of one-half a scanning line, the samples representing the areas 612 and 608 will be separated from the sample to be predicted by intervals equal to one field period plus and minus, respectively, one-half a line scanning period.

With reference again to Fig. 5, the sampler 102 which samples the signals from the source 101 provides a continuous series of message samples to the delay arrangement 200 which is used to derive the samples representing the areas shown in Fig. 6. For the sake of simplicity, the same reference characters wil be used for the samples and the areas to which they correspond. In this arrangement the same reference characters will be used for the samples 603, 607 and 611, the sample 600 is not the sample being then applied to the delay arrangement but rather is a sample delayed one sampling interval therefrom. Accordingly, the samples being supplied are applied to the elemental delay means 110 which is provided with taps 700, 701 and 702 separated by intervals corresponding to delays of one sampling period for deriving samples 600, 601 and 602. Additionally, the input samples are applied to the line delay means 150 which provides a block delay of one scanning line period and then to the elemental delay means 120 for access from which are derived the samples 603, 604, 605, and 606 from the taps 703, 704, 705 and 706, respectively. It can be seen that this arrangement delays the sample 603 one line period less one elemental period with respect to the sample 600. Similarly, samples from successive taps 604, 605 and 606 will be delayed additional elemental intervals. In like manner by applying the messages samples by way of the delay means 120, which introduces a block delay of one field period less one-half a line period, to the elemental delay means 130, there will be derived from the taps 707, 708, 709 and 710 the samples 607, 608, 609 and 610, respectively. Moreover, by introducing the delay means 160 to provide an additional block delay of one line time between the delay means 170 and the elemental delay means 140, there can be derived from the taps 711, 712, 713 and 714 the samples 611, 612, 613 and 614, respectively. The delayed samples 601 through 614, which have been derived, are weighted by suitable attenuating means adjusted in accordance with the signal statistics and thereafter applied to the correct input of a differential amplifier for deriving a predicted value, in the manner described for the delayed samples derived in the predictor of Fig. 4. Additionally, if it is desired to obtain directly the error in prediction rather than the predicted value, the sample 600 is also applied to the differential amplifier. For the sake of simplicity, the attenuators, polarity switches, and the differential amplifier have been omitted in this figure. It should be evident that this arrangement can be extended indefinitely to include as much of the preceding history as the signal statistics require for the degree of accuracy in prediction sought.

Although it is found convenient to employ conventional electrical delay lines for the elemental delay means 110, 120, 130 and 140, tapped to provide discrete delays of a Nyquist interval (the order of tenths of microseconds), it is found preferable to utilize electromechanical or so-called acoustic delay lines to serve as the delay means 150 and 160 to achieve block delays of the order of a television line time (approximately 63.5 microseconds). Such lines comprise essentially two piezoelectric crystal transducers associated with a solid acoustic transmitting medium such as fused silica or glass. The electrical signals to be delayed are impressed upon the input crystal for conversion into mechanical vibrations in the nature of acoustic waves. These, in turn, are imparted to the solid transmitting medium. The required delay occurs during the traverse therethrough to the output crystal which reconverts the vibratory waves into electrical signals. Such a delay line is more completely described in an article entitled "Ultrasonic solid delay lines" by D. L. Arenberg in the Journal of Acoustical Society of America, January 1948.

Figure 7:
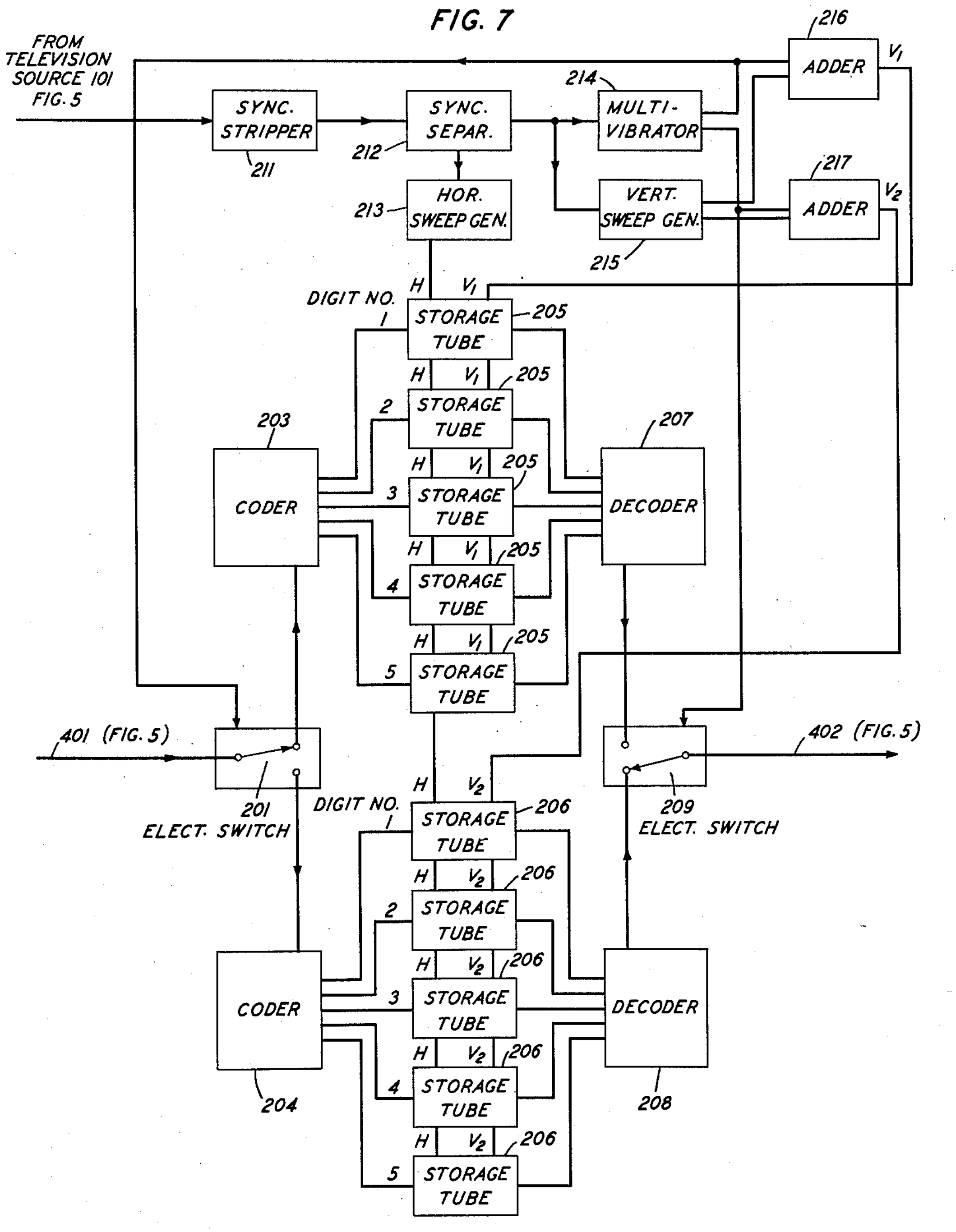
Fig. 7 is a schematic block diagram of an exemplary arrangement for obtaining a delay of a field period less one-half a line period for use in the predictor of Fig. 5.

Additionally, it is found convenient to employ storage tubes to realize the relatively long delay of a field time less one-half line time. The present state of the storage tube art is such that greater reliability is afforded by an arrangement of a plurality of storage tubes such as that shown in Fig. 7 which can be inserted in the arrangement of Fig. 5, in the manner shown between the leads 401 and 402 for the delay means 170. In the arrangement of Fig. 7, the signal samples are applied to an electronic switch 201 for supplying successive fields alternately to one of the PCM coders 203 and 204. These coders and the corresponding decoders can, for example, be of the kind described in the above-mentioned articles of the January 1948 Bell System Technical Journal and are used to encode each signal sample as a number of pulses, each of which represents a binary digit. In accordance with standard pulse code modulation practice, the number $n$ of digits is determined by the number of quantization levels. The relationship is, of course, that $n$ digits correspond to $2^n$ levels. In the illustrative arrangement shown here, each coder output consists of five digits, corresponding to thirty-two levels of quantization. When the message samples which are to be delayed one field time are supplied to one of the coders, there will be produced therefrom five pulses, each representing a digit of the input sample amplitude. Each of these pulses is supplied to one of the five storage tubes of the two banks 205 and 206, one bank being employed with each coder. In particular, these storage tubes can, for example, be of the same general type as the barrier grid storage device described in an article in the R. C. A. Review, volume IX, pages 112 through 135, March 1948, entitled "Barrier grid storage tube and its operation." These storage tubes are storage devices wherein an input signal is stored in the form of an electrostatic charge distribution for a period of time and converted subsequently into an output signal which is a representation of the stored signal. Storage devices of this kind make use of the fact that a pattern of electrostatic charges deposited on the surface of a good insulator can be retained for an appreciable period of time. In Fig. 7A, there is shown schematically a storage tube of this general type. In the operation of such a device, a cathode-ray beam from the electron gun 221 is deflected to scan elemental areas of the face of a dielectric storing surface 222 and the potential or charge deposited upon each of the elemental areas of the bombarded face is selectively varied in accordance with input signals, as for example, by modulation of the potential of the back plate 223. Thereafter, by a subsequent scanning, as, for example, at a constant back plate potential, the charges upon these areas are resolved into respective potential changes in an output circuit connected to a collector electrode 224. The scanning pattern of the beam is controlled by the horizontal deflection means 225 and the vertical deflection means 226. In particular, if the signal is first coded, and thereafter stored as a binary pulse code of off-on pulses, the effect of noise variations which customarily characterize storage may be eliminated. It is a characteristic of this storage operation that there is introduced in the recovered signal a delay which is equal to the interval between the storing and reading of each particular element.

In the present arrangement, an entire field of the coded television signal is deposited as a signal charge pattern in one field period storing cycle on the storage surfaces of one bank of storage tubes and thereafter recovered during the next field. The use of two banks in parallel as shown in Fig. 7 permits the continuous storage and recovery of both fields of the television signal. To this end, for example, the odd-numbered fields of the television signal are stored on the first bank of tubes 205 and are recovered while the even-numbered fields are being stored in the other bank 206. Then the first bank of tubes will be read during the storage of the even-numbered fields in the other bank. However, for interlacing there is a vertical displacement between scanning patterns of successive fields. Accordingly, in the present case, since it is necessary that the reading and storing patterns on each bank coincide if a true facsimile of the stored signal is to be recovered, a vertical correction must be made in the scanning patterns in each bank. In particular, if a field period less one-half a line period delay interval is to be achieved between the storing and reading of any particular element, the storing beam should be displaced upwards the normal separation between two adjacent lines in a complete frame relative to the reading pattern. By reversal of this displacement, it would be possible to achieve a delay interval of a field period plus one-half a line period. The necessary displacements are achieved here by adding a compensating component to the sweep voltages supplied to the vertical deflection means, in a manner described more completely hereinafter.

The synchronization of the various processes involved is controlled by the synchronizing information in the television signal. To derive this information, the input television signal is supplied by way of the synchronizing stripper 211 to the synchronizing separator 212, both of which may be of the kind usual in any television receiver for deriving horizontal line and vertical field synchronizing pulses. The line synchronizing pulses derived therefrom are used directly to control the sweep generator 213 which provides horizontal sweep signals H for simultaneous application to all the storage tubes of both banks. The vertical synchronizing pulses are applied simultaneously to the vertical sweep generator 215 which provides a sweep signal V and to the multivibrator 214 which may be of any suitable design for producing two oppositely poled square waves each half cycle of which corresponds to one field time. These square waves are applied to the adders 216 and 217, respectively, each of which is also supplied with the sweep voltage V. The resultants, the sweep voltages $V_1$ and $V_2$, are applied to the vertical deflection means of the storage tubes of banks 205 and 206, respectively. The details of these sweep signals are set forth below. These sweep signals are designed to assure the coincidence of the storing and reading patterns over the portion of the storage surface upon which picture information has been deposited. The outputs derived from reading each bank of tubes is decoded in the associated decoders 207 and 208, each of which reproduces in turn delayed facsimiles of alternate fields of the input television signal. The separate recovered fields are inserted in turn, under the control of the electronic switch 209, to the output for utilization. The electronic switches 201 and 209 are of any suitable design for switching at the field rate under the control of the oppositely poled square wave outputs of the multivibrator 214 and thus connect to opposite banks at any one time.

Figs. 8A through 8F are diagrams to which reference will be made in describing the arrangement for bringing the storing and reading patterns into correspondence in the two banks 205 and 206.

Figure 8A:
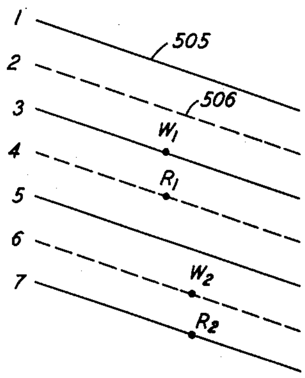
Figs. 8A through 8F are diagrams useful in explaining the operation of the arrangement of Fig. 7.

Fig. 8A shows a portion of the raster of a television picture. The solid lines 505 illustrate the odd-numbered field pattern, while the dashed lines 506 indicate the even-numbered field pattern. To achieve the desired delay of one field period less one-half a line period, it is evident that when an element $W_1$ is being written during an odd field, element $R_1$ from the even field must be read. Similarly, when element $W_2$ is being written during an even field, element $R_2$ from the odd field must be read. Accordingly, to provide correspondence of elements $W_1$ and $R_1$ the reading beam must be displaced downward relative to the writing beam by one line pitch (i. e., the separation between two adjacent scanning lines in a complete frame). In the embodiment shown in Fig. 5, this is achieved by displacing the writing spot up one-half this distance and the reading spot down this same distance.

Figure 8B:
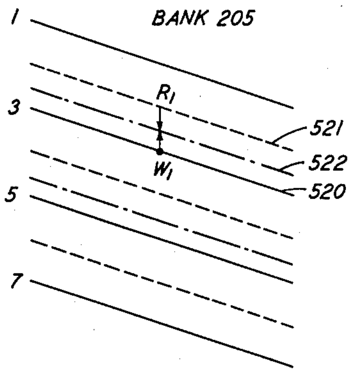

Fig. 8B shows the scanning relationships that exist in each tube of the bank 205. The solid lines 520 represent the scanning pattern normally present during an odd field and the dashed lines 521 the scanning pattern during the even field. Assume that element $W_1$ is stored. It can be seen that one field period less one-half a line period later the scanning beam will be on the element $R_1$ instead of on the element $W_1$. When the odd field writing beam is displaced upwards one-half a line pitch and the even field reading beam downwards this distance, the two scanning patterns will be in correspondence and as shown by the dot-dash lines 522.

Figure 8C:
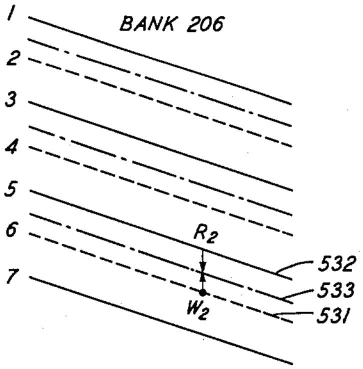
Figure 8D:
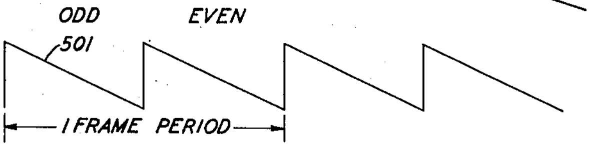

Similarly, Fig. 8C shows the scanning relationships that exist in each tube of the bank 206. In this case, the scanning pattern of the even field is shown as the dashed lines 531 and the scanning pattern of the odd field as the solid lines 532. Assume that element $W_2$ is stored. At the time of desired delay later, the scanning pattern will be at element $R_2$. Here if the even field writing beam is displaced upwards one-half a line pitch and the odd field reading beam this same distance downwards, the two scanning patterns will coincide and be as shown by the dot-dash lines 533.

Figure 8E:
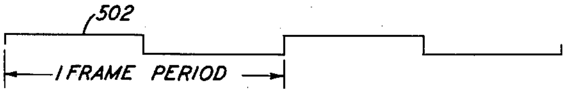
Figure 8F:
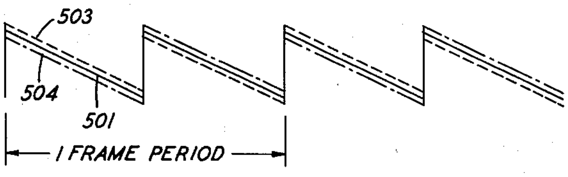

Fig. 8E shows one output of the multivibrator 214 which is a square wave having each half-cycle equal to one field time. This wave is added in the adder 217 (Fig. 5) to the sweep wave 501 to form the vertically adjusted sweep signal $V_2$ shown as the dashed line 503 in Fig. 8F. Similarly, an output (not shown) from the multivibrator 214 oppositely poled to that shown in Fig. 8E is added in the adder 216 to the sweep wave 501 to form the vertically adjusted sweep signal $V_1$ shown as the dot-dashed line 504 in Fig. 8F.

It can be seen that the amplitude of each of the two square wave outputs of the multivibrator 214 should be adjusted to effect the necessary displacement of the scanning beams in the storage tubes.

It is of course within the ambit of the invention not to use the entire structure of Fig. 5, but merely to employ delays of one or two lines so as materially to improve the prediction afforded by the arrangement of Fig. 4 by increasing the dimensionality upon which the prediction is based. It is, for example, in general true that the prediction afforded by the three previous samples along one line is inferior to that afforded by the use of one previous element on that line and the two elements on the line immediately above, thus:

$$\begin{matrix} S_{11} & S_{10} \\ \circ & \circ \\ \circ & \circ \\ S_{01} & S_{00} \end{matrix}$$

where $S_{00}$ is the element to be predicted. For purposes of illustration, the arrangement can be considered where the prediction is set such that $$S_p = S_{10} + S_{01} - S_{11}$$

In the case that the brightness in the neighborhood of $S_{00}$, as a function of $x$ and $y$, is a plane sloped in any direction, the prediction thus afforded will be perfect. This particular combination would also predict quite well across vertical or horizontal edges. It is seen to be characteristic of this prediction that the arithmetic sum of the weighting coefficients is equal to unity. It will generally be the case that the arithmetic sum of the weighting coefficients in any particular prediction will be substantially unity.

Fig. 9 shows one suitable circuit arrangement for a predictor of the kind shown schematically in Fig. 4. In this arrangement prediction is made on the basis of the three preceding signal samples spaced at Nyquist intervals from the instant sample. In addition this arrangement includes provision for subtracting the instant sample from the predicted value to provide an error signal directly, as has also been discussed hereinbefore. The samples provided by the sampler 802 are first amplified by the amplifier 811 and applied thereafter to one end of a lossless delay line 803, the other end of which is terminated in the characteristic impedance $R_c$ of the line to avoid reflections. Spaced along this delay line with a separation of a Nyquist interval between each adjacent pair are the three taps 804, 805 and 806, from which may be derived samples immediately preceding the instant sample. To avoid reflections back into the delay line, it is desirable to supply isolating means at each tap. In this arrangement, a cathode follower at each tap is employed to this end. The taps 804, 805 and 806 supply the control grids of the cathode followers V1, V2 and V3, respectively. Additionally, the instant sample is applied to the control grid of the cathode follower $V_0$ by means of tap 820. The level of the signal from each of the cathode followers can be varied by means of the potentiometers $P_1$, $P_2$, $P_3$ and $P_0$ in the cathode circuits of tubes V1, V2, V3 and V0, respectively. In this way, the amplitude of each of the samples can be adjusted in accordance with the signal statistics of the message wave. It is usually more convenient if the "no signal" potential on each of the potentiometer taps is at ground potential. This is here achieved by placing a negative bias on the grids of the cathode followers of such an amount that in the absence of signals, the cathodes of all of these tubes are at ground potential. In the arrangement shown here, this biasing means includes the resistance 812 and the by-passed variable resistance 810, which is adjusted to effect this desired condition. Each of the cathode follower outputs is applied to its respective polarity switch $S_1$, $S_2$, $S_3$ and $S_0$. These double-poled, double-throw switches determine to which side of a differential amplifier, consisting of tubes V5 and V6, the particular signal is sent. To secure independence of the adjustments of the potentiometers, the signals are combined through L-type attenuator pads of substantial loss including the resistance 813 or 814 and one of the resistances $R_0$, $R_1$, $R_2$, and $R_3$. In addition, the double-pole double-throw switches are so connected as to terminate the series arms of the unused attenuator sections in a resistance equal to the average resistance looking into the taps of the potentiometers. Signals to be added are applied to the control grid of one section of the differential amplifier (V5 or V6) and signals to be subtracted are applied to the control grid of the other section. Each signal is applied by way of its mixing resistor ($R_1$, $R_2$, $R_3$ or $R_0$) to the appropriate grid. To obtain the differential action, the cathodes of sections V5 and V6 are coupled together and then connected through the common cathode resistance 815 to the negative terminal of voltage supply 840. For good differential action, it is important that resistor 815 be considerably greater than $$\frac{1}{g_m}$$

where $g_m$ is the transconductance of each of the two tubes V5 and V6. The output signal is derived across the load resistance 816 in the plate circuit of the tube V6. It should be clear that this arrangement is adaptable for the algebraic summation of an indefinite number of signals of each polarity. The differential output in the present case is the error signal since the instant sample which is supplied by the cathode follower $V_0$ is also applied to the side of the differential amplifier appropriate for subtraction from the predicted value. This error signal is supplied to the control grid of the cathode follower V7, whose output is applied to the utilization device 104. The bias on tube V7 is adjusted by means of the potentiometer 821 so that the "no signal" potential on its cathode is zero. This avoids the need of a large electrolytic capacitance in the output to block constant operating potentials. It can be seen that this arrangement utilizes a linear combination of preceding samples in accordance with signal statistics in predicting the value of an instant sample.

As is stated above, it is also within the practice of the invention to employ a variant or a non-linear predictor. In fact, non-linear encoding techniques are in many embodiments of the invention to be preferred to the extremely complex linear devices, which highly accurate linear invariant prediction would entail. It can be said that prediction is effectively a form of coding and that the predictor described above really performs a certain type of encoding or computing operation on the message.

Even though a good predictor can, in accordance with the invention, be made for a given signal, the problem remains of adapting to the channel the error signal which results. In television, for example, the error signal might consist of a sizeable number of small amplitude errors (plus or minus one or two quantizing steps and many errors of zero) and a few high amplitude errors. Evidently, whereas the average power in the error signal may be very much less than in the original signal, the peak power might be just as big. A recoding or remapping operation is therefore indicated in order to make the average power more nearly comparable to the peak power, but just how this can best be done depends upon the statistics of the error signal, i. e., the probability distribution of error amplitudes.

One feasible remapping technique which is within the scope of the invention is to "draw the line" at an error of $\pm g$ quantizing steps. Any error less than or equal to $g$ in magnitude is sent directly as a quantized pulse. Any error greater than $g$ is sent as a code group (preceded by an identifying pulse to indicate to the receiver that a code group is coming). Thus, to choose an illustrative value, a pulse amplitude modulation (PAM) signal having four or five quantizing steps would suffice for the whole signal, at a slight increase in band width. Alternatively, the signal can be converted to a two or three digit binary PCM, which is a considerable improvement over the six or seven digits required for direct transmission in accordance with the techniques now generally in use. In another embodiment, the base four or five PAM signal is remapped (taking the pulses in pairs) to a base 16 or 25 PAM signal at half the band width. This sort of multiple transmission remapping technique is well known in the art.

In the event that the error signal, or any digit of the code group representing the error signal, contains long runs of zeros, i. e., many successive samples of zero amplitude, it is in accordance with the invention to send in place of these a code group specifying the length of the run. The efficiency of this method is manifest with runs on the order of seven or eight or more samples but not fewer, since the specifying code group may take three or four pulses itself. The same method can be extended in the event that long runs of any amplitude are found in the error signal, but in this situation, it is necessary to send the sample height as well as the length of the run so that this system does not become efficient except with runs of a considerable length.

It can be seen that numerous arrangements may be devised by those skilled in the art without departing from the spirit and scope of the present invention, and so it is to be understood that those arrangements which have been described are illustrative of the application of the general principles of the invention.

What is claimed is:

1. In a television system which uses an interlaced scanning pattern in the reproduction of the television scene, an arrangement to be supplied with an input television signal for delaying the television signal one field period less one-half a scanning line period comprising a pair of storing means, each including a storage surface, means for producing a cathode-ray scanning beam for in turn depositing a charge pattern on said storage surface in accordance with an input signal and subsequently deriving an output signal from said charge pattern which is a delayed facsimile of the input signal, and vertical and horizontal deflecting means for sweeping the cathode-ray beam across said storage surface, means supplying horizontal synchronizing pulses recurrent at the line rate frequency and the vertical synchronizing pulses recurrent at field rate frequency, means utilizing the horizontal and vertical synchronizing pulses for deriving horizontal and vertical sweep signals, means further utilizing said vertical synchronizing pulses for providing a square wave signal for adding and subtracting from the vertical sweep signal to obtain first and second vertically adjusted sweep signals, respectively, means for supplying successive fields of the television signal as an input to a different one of the two storing means, means for supplying the horizontal sweep signals to the horizontal deflection means of both storing means and the first and second vertically adjusted sweep signals to the vertical deflection means of different ones of the storing means, and means for supplying the output signals derived from each of the storing means in turn to output utilization means.

2. In a television system which employs an interlaced scanning pattern in the reproduction of the television scene, an arrangement to be supplied with an input television signal for delaying the television signal one field time period less one-half a line period comprising means for sampling said television signal and deriving message samples, means for coding said samples in a binary pulse code, two arrays of storage devices, one device in each array for each digit of the binary code, each device including a storage surface, means for producing a cathode-ray scanning beam for in turn depositing a charge pattern on said storage surface in accordance with an input signal and subsequently deriving an output signal from said charge pattern which is a delayed facsimile of the input signals, and vertical and horizontal deflecting means for sweeping the cathode-ray beam across said storage surface, means supplying horizontal and vertical synchronizing pulses, means utilizing said horizontal and vertical synchronizing pulses for deriving horizontal and vertical sweep signals, means further utilizing said vertical synchronizing pulses for providing a square wave signal for addition and subtraction from the vertical sweep signal for obtaining first and second vertically adjusted sweep signals, respectively, means for supplying successive fields of the coded television signal as an input to a different one of the storage device arrays, means for supplying the horizontal sweep signals to the horizontal deflection means of all the storage devices and the first and second vertically adjusted sweep signals to the vertical deflection means of the storage devices of one and the other array, and means for decoding the output signals derived from the storage devices of each array and supplying the decoded output signals to output means for utilization.

3. In a television transmission system, means to be supplied with a television wave for providing a succession of wave samples, delay means to be supplied with said succession of wave samples for providing at each instant a plurality of delayed wave samples including means supplying at each instant a wave sample delayed substantially one television field time less one half a television line time, weighting means supplied with said plurality of delayed samples including said wave sample delayed substantially one television field time less one half a television line time for weighting each sample in a predetermined way and combining the weighted samples for deriving a predicted value sample, means supplied at each instant with an instant sample and the predicted value sample for deriving an error signal therebetween, and means for transmitting to a receiving point a measure of the error signal.

4. In a television transmission system, means to be supplied with a television wave for providing a succession of wave samples, delay means to be supplied with said succession of wave samples for providing at each instant a plurality of delayed wave samples including means providing at each instant a wave sample delayed substantially one television field time plus one half a television line time, weighting means supplied with said plurality of delayed samples including said wave sample delayed substantially one television field time plus one half a television line time for weighting each sample in a predetermined way and combining the weighted samples for deriving a predicted value sample, means supplied at each instant with an instant sample and the predicted value sample for deriving an error signal therebetween, and means for transmitting to a receiving point a measure of the error signal.

5. In a television transmission system, means to be supplied with a television wave for providing a succession of wave samples, delay means to be supplied with said succession of wave samples for providing at each instant a plurality of delayed wave samples including means providing at each instant a wave sample delayed substantially one television field time less one half a television line time and a wave sample delayed substantially one television field time plus one half a television line time, means for weighting said plurality of delayed samples and combining the weighted samples for providing a predicted value sample, and means for comparing an instant sample with the predicted value sample for deriving an error signal for transmission.

6. In a television transmission system, means to be supplied with a television wave for providing a succession of wave samples, delay means to be supplied with said succession of samples for providing at each instant a wave sample delayed substantially one television field time less one half a television line time and a wave sample delayed substantially one television field time plus one half a television line time, means for combining said delayed samples for deriving at each instant a predicted value sample, and means for comparing at each instant an instant sample and the predicted value sample for deriving an error signal for transmission to a receiving point.

References Cited in the file of this patent

UNITED STATES PATENTS

| | | |
|---|---|---|
| 2,202,605 | Schroter | May 28, 1940 |
| 2,321,611 | Moynihan | June 15, 1943 |
| 2,516,587 | Peterson | July 25, 1950 |
| 2,530,538 | Rack | Nov. 21, 1950 |
| 2,629,010 | Graham | Feb. 17, 1953 |

FOREIGN PATENTS

| | | |
|---|---|---|
| 928,783 | France | Dec. 8, 1947 |

OTHER REFERENCES

Bell System Technical Journal, vol. 27, January 1948, "Electron Beam Deflection Tube for Pulse Code Modulation," pp. 44–57.